United States Patent [19]

Enami

[11] Patent Number: 5,307,439
[45] Date of Patent: Apr. 26, 1994

[54] DRIVING CIRCUIT FOR CONTROLLING THE SPEED OF A MOTOR IN PWM AND LINEAR MODES

[75] Inventor: Hiroyuki Enami, Tokyo, Japan

[73] Assignee: NEC Corporation, Tokyo, Japan

[21] Appl. No.: 832,051

[22] Filed: Feb. 6, 1992

[30] Foreign Application Priority Data

Feb. 6, 1991 [JP] Japan ................................ 3-015045

[51] Int. Cl.[5] ............................................. H02P 5/17
[52] U.S. Cl. ..................................... 388/811; 388/829
[58] Field of Search ............... 318/802, 811, 439, 599, 318/138, 254, 778, 799, 810, 809, 800, 748; 363/41; 388/811, 829, 809, 828

[56] References Cited

U.S. PATENT DOCUMENTS

| | | | |
|---|---|---|---|
| 4,712,050 | 12/1987 | Nagasawa et al. | 318/138 |
| 4,868,469 | 9/1989 | Chan | 318/599 |
| 4,926,104 | 5/1990 | King et al. | 318/599 |

Primary Examiner—Jonathan Wysocki
Assistant Examiner—John W. Cabeca
Attorney, Agent, or Firm—Leydig, Voit & Mayer

[57] ABSTRACT

A driving circuit for a motor such as a spindle motor used in a floppy disc driver, a hard disc driver, etc. includes an output stage driver which supplies a driving current to a motor to rotate at a constant rotation speed. The driving current is supplied to the motor in an off-and-on way in which the power loss is small at a starting state, while the driving current is supplied thereto in changing linearly in which there generates little noise at a stationary state.

15 Claims, 2 Drawing Sheets

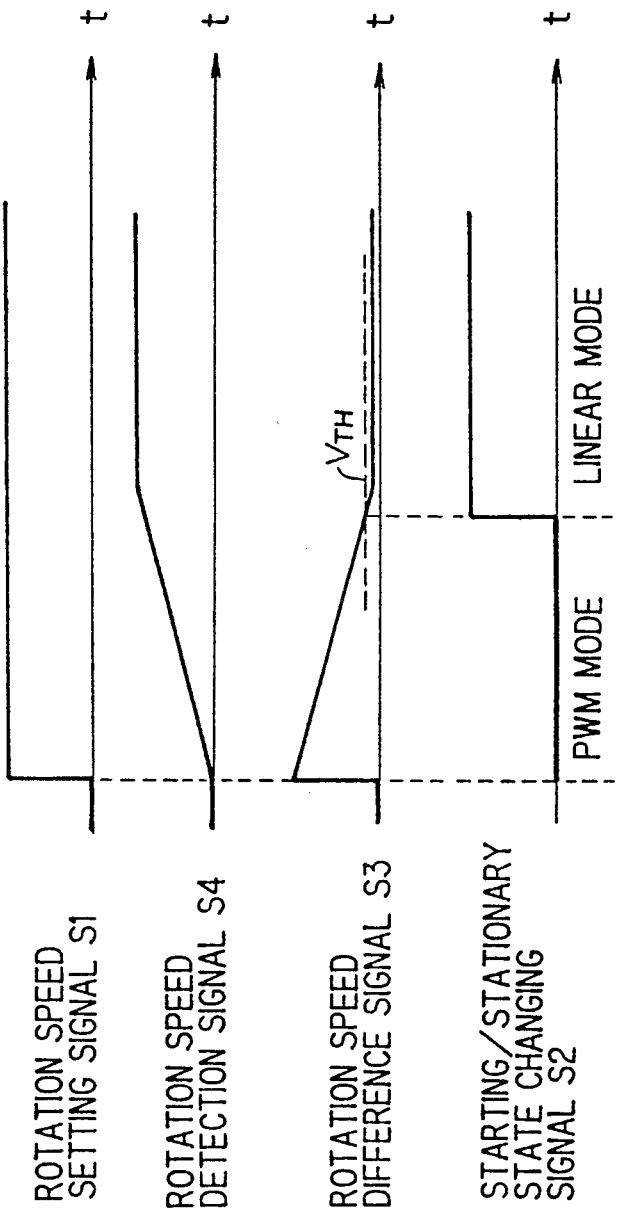

DRIVING CIRCUIT FOR CONTROLLING THE SPEED OF A MOTOR IN PWM AND LINEAR MODES

FIELD OF THE INVENTION

This invention relates to a driving circuit for a motor, and more particularly to, a driving circuit for a motor such as a spindle motor used in a floppy disc drive or a hard disc drive as a magnetic data memorizing system.

BACKGROUND OF THE INVENTION

In a conventional magnetic data memorizing system such as a floppy disc drive or a hard disc drive, residual magnetism as data on a surface of the disc is detected to be converted to an electric signal while the disc is rotated by a motor such as a spindle motor. The motor is driven by a driving circuit including transistors to rotate at a constant rotation speed. Such a transistor generates noises when it becomes at ON or OFF state. However, a voltage induced in a magnetic head thereof is as weak as usually up to 1 mV at the most, so that it is required to avoid generation of noises. Therefore, the motor is controlled by a so-called linear mode control in which the transistor of the driving circuit operates within an unsaturated (linear) operation region.

According to the conventional magnetic data memorizing system, however, there is a disadvantage in that the power loss is large especially at a starting state at which a large driving current is required, so that it is difficult to increase an average current of an integrated circuit (IC) including the driving circuit for a motor in the magnetic data memorizing system. Further, it is difficult to rise the rotation speed of the motor quickly at the starting state.

SUMMARY OF THE INVENTION

Accordingly, it is an object of the invention to provide a driving circuit for a motor in which the power loss is reduced at a starting state.

This object is achieved by providing a driving circuit for a motor which includes a rotation speed control circuit for receiving a rotation speed setting signal and a rotation speed detection signal, for generating a control signal to change excitation phases, and for generating a rotation speed difference signal in accordance with a difference between the rotation speed setting signal and the rotation speed detection signal. An excitation phase changing circuit is provided for generating a plurality of phase changing signals and a plurality of rotation speed control signals in accordance with the control signal from the rotation speed control circuit. The driving circuit includes first and second output stage drivers for receiving the phase changing signals and rotation speed control signals. The first and second /utput stage drivers are connected to the motor. A rotation speed detector generates the rotation speed detection signal by detecting a rotation speed of the motor. A driving current detector generates a driving current detection signal by detecting a driving current of the motor. A first comparator generates an output signal dependent on a difference between the rotation speed difference signal and the driving current detection signal. A second comparator generates an output signal dependent on a difference between a triangle wave and the output signal of the first comparator. A circuit connected to the excitation phase changing circuit and the first and second output stage drivers supplies the rotation speed control signal to the first and second output stage drivers. A rotation speed control signal supplying circuit provides a first state for supplying the plurality of rotation speed control signals to the first and second output stage drivers and a second state for not supplying the plurality /f rotation speed control signals to the first and second output drivers in response to an output signal of the second comparator during a starting time of the motor. The rotation speed control signal supplying circuit also includes a state for amplifying the rotation speed control signals supplied to the first and second output stage drivers dependent upon the output signal of the first comparator at a constant rotation time of the motor.

BRIEF DESCRIPTION OF THE DRAWINGS

The invention will be explained in more detail in conjunction with appended drawings wherein:

FIG. 2 is a timing chart explaining operation of the preferred embodiment.

DESCRIPTION OF THE PREFERRED EMBODIMENTS

Figure 1:
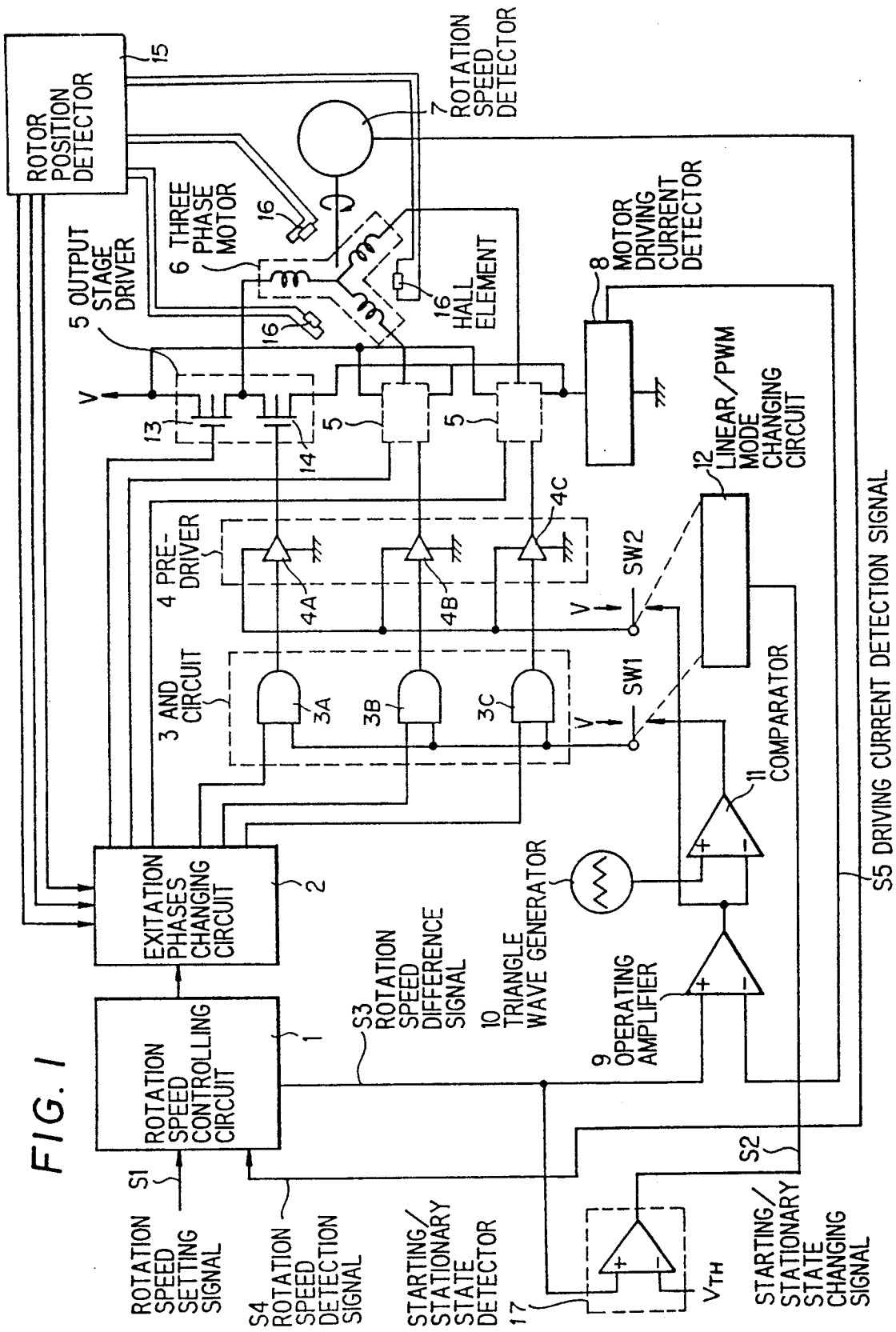
FIG. 1 is a block diagram of a driving circuit for a motor in a preferred embodiment according to the invention.

As shown in FIG. 1, a driving circuit for a motor includes a control loop for keeping a constant rotation speed of a three phase motor 6. The control loop consists of a rotation speed feed-back loop and a driving current feed-back loop. The rotating speed feed-back loop includes a rotation speed controlling circuit 1 which controls a rotation speed of the three phase motor 6, an excitation phases changing circuit 2 which supplies excitation phase changing signals to the three phase motor 6, and a rotation speed detector 7 which detects the rotation speed of the three phase motor 6, and a rotor position detector 15 which detects a position of a rotor of the three phase motor 6 in corporation with three hall elements 16. The driving current feed-back loop includes an AND circuit block 3 including three AND circuits 3A, 3B and 3C, a pre-driver 4 including three amplifiers 4A, 4B and 4C, three output stage drivers 5A, 5B and 5C each including two MOS transistors 13 and 14, a driving current detector 8, an operational amplifier 9, a triangle-wave generator 10, a comparator 11, a linear/PWM mode changing circuit 12, a starting/stationary state detector 17, and two switches SW1 and SW2.

In operation, the rotation speed controlling circuit 1 supplies the excitation phases changing circuit 2 with a control signal in accordance with a rotation speed setting signal S1 which is supplied from an external circuit. The excitation phases changing circuit 2 generates two groups of signals in accordance with signals supplied from the rotor position detector 15. The first group consists of phase changing signals PS1, PS2 and PS3 each having a shifted phase of 120° to each other for changing phases of the driving current to be supplied to the three phase motor 6. The second group consists of rotation speed control signals CS1, CS2 and CS3 each having a shifted phase of 120° to each other for maintaining the three phase motor 6 to rotate at a constant rotation speed.

Each of the phase changing signals PS1, PS2 and PS3 is supplied to a gate of each MOS transistor 13 of the output stage drivers 5A, 5B and 5C, so that the transistors 13 become at ON state successively in accordance with the phase changing signals PS1, PS2 and PS3 to make the three phase motor 6 rotate. On the other hand, each of the rotation speed control signals CS1, CS2 and CS3 is supplied to a gate of each MOS transistor 14 of the output stage drivers 5A, 5B and 5C through each of the AND circuits 3A, 3B and 3C and each of the amplifiers 4A, 4B and 4C. Each transistor 14 is controlled by the rotation speed control signals CS1, CS2 and CS3 so that the three phase motor 6 rotates at a constant rotation speed.

The rotation speed is detected by the rotation speed detector 7 which supplies a rotation speed detection signal S4 to the rotation speed controlling circuit 1. The rotation speed controlling circuit 1 generates a rotation speed difference signal S3 which is a difference between the detected rotation speed of the three phase motor 6 and the set rotation speed which is set by the rotation speed setting signal S1.

The driving current detector 8 detects the driving current which flows through the output stage drivers 5A, 5B and 5C for driving the three phase motor 6, and generates a driving current detection signal S5. The operational amplifier 9 amplifies a difference between the rotation speed difference signal S3 and the the driving current detection signal S5. The comparator 11 compares an output signal of the operational amplifier 9 with a triangle-wave as a standard voltage generated by the triangle-wave generator 10 and generates a PWM (pulse width modulation) output signal. The linear/PWM mode changing circuit 12 controls states of the switches SW1 and SW2. The switch SW1 selectively connects one of two input terminals of each of the AND circuits 3A, 3B and 3C with the power supply voltage V or an output of the comparator 11. The switch SW2 selectively connects power supply terminals of the amplifiers 4A, 4B and 4C with the power supply voltage V or the output of the operational amplifier 9.

Each MOS transistor 14 of the output stage drivers 5A, 5B and 5C operates within a saturated operation region at a starting state in which a large power is required, and during which it is not required to avoid noises. This mode is called as a PWM mode. On the other hand, each MOS transistor 14 operates within an unsaturated (linear) operation region at a stationary state in which a large power is not required. This mode is called as a linear mode. The two modes are selected by the starting/stationary state detector 17 which compares the rotation speed difference signal S3 with a threshold voltage $V_{TH}$. If a level of the rotation speed difference signal S3 is higher than the threshold voltage $V_{TH}$, the starting/stationary state detector 17 supplies a signal to the linear/PWM mode changing circuit 12 to change states of the switches SW1 and SW2 so that the driving circuit operates in the PWM mode, elsewhere the driving circuit operates in the linear mode.

In operation of keeping a constant rotation speed of the three phase motor 6 at the PWM mode, the linear/PWM mode changing circuit 12 controls states of the switches SW1 and SW2 so that the switch SW1 connects each one input of the AND circuits 3A, 3B and 3C with an output of the comparator 11 and the switch SW2 connects the power supply terminals of the amplifiers 4A, 4B and 4C with the power supply voltage V. In this mode, each one of two inputs of each AND circuit is supplied with the output of the comparator 11 which is a converted signal of the PWM mode, so that the AND circuits 3A, 3B and 3C are turned on and off in accordance with a pulse width (duty cycle) of the output signal of the comparator 11. On the other hand, the gain of the amplifiers 4A, 4B and 4C is kept constant. Therefore, each MOS transistor 14 of the output stage drivers 5A, 5B and 5C is turned on and off in accordance with the pulse width of the output signal of the comparator 11. If the rotation speed of the three phase motor 6 is rising to the set rotation speed, the time of high level in the output signal of the comparator 11 becomes long in each period, that is, the duty cycle is large, so that the time of ON state of the MOS transistors 14 becomes long. Consequently, the time in which the driving current flows becomes long, that is, an average current is large, to make the three phase motor 6 rotate faster. If the rotation speed of the three phase motor 6 becomes proximate to the set rotation speed, the time of high level in the output of the comparator 11 becomes short, so that the time of ON state of the MOS transistors 14 becomes short. Consequently, the time of the motor driving current becomes short in each period to make the three phase motor 6 rotate slower.

In operation of keeping a constant rotation speed of the three phase motor 6 at the linear mode, the linear/PWM mode changing circuit 12 controls states of the switches SW1 and SW2 so that the switch SW1 connects each one input of the AND circuits 3A, 3B and 3C with the power supply voltage V and the switch SW2 connects the power supply terminals of the amplifiers 4A, 4B and 4C with the output of the operational amplifier 9. In this mode, each one of two inputs of each AND circuit is supplied with the power supply level, so that the rotation speed control signals CS1, CS2 and CS3 supplied from the exciting phases changing circuit 2 are directly supplied to the amplifiers 4A, 4B and 4C. On the other hand, the power supply terminals of the amplifiers 4A, 4B and 4C are supplied with the output of the operational amplifier 9 which corresponds to the difference between the rotation speed difference signal S3 and the driving current detection signal S5, so that output levels of the amplifiers 4A, 4B and 4C change in accordance with the difference between the rotation speed difference and the motor driving current. Therefore, an ON resistance of each MOS transistor 14 of the output stage drivers 5A, 5B and 5C is controlled within the linear operation region in accordance with the output signal of the operational amplifier 9. If the rotation speed of the three phase motor 6 is smaller than the set rotation speed, the output levels of the amplifiers 4A, 4B and 4C become large, so that the ON resistance of the MOS transistors 14 becomes low. Consequently, the motor driving current becomes large to make the three phase motor 6 rotate faster. If the rotation speed of the three phase motor 6 is larger than the set rotation speed, the output levels of the amplifiers 4A, 4B and 4C become small, so that the ON resistance of the MOS transistors 14 becomes high. Consequently, the motor driving current becomes small to make the three phase motor 6 rotate slower. The above described operation is explained in the timing chart of FIG. 2 which is self-explanatory.

As explained above, the driving circuit for a motor in the preferred embodiment has the low power loss at a starting state by the PWM mode operation, and generates little noise at a stationary state by the linear mode operation. Therefore, a designer is required to consider only about the power loss at a stationary state of the driving circuit when determining an allowable power loss of a package of an IC including the driving circuit, so that it is possible to determine an average current of the IC to be larger than that of an IC including the conventional driving circuit, or it is possible to adopt a smaller package for an IC consuming the same average current as the conventional one.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A driving circuit for a motor comprising:
   means for driving a motor by supplying said motor with a driving current having different phases;
   means for supplying a phase change signal to said driving means so that said driving current is supplied to rotate said motor at a predetermined rotation speed;
   means for controlling a rotation speed of said motor by supplying a control signal to said supplying means in accordance with a rotation speed setting signal which determines said predetermined rotation speed; and
   means for keeping said rotation speed of said motor at said predetermined rotation speed by controlling said driving current of said driving means, said driving current being controlled in an off-and-on way in a starting state with a predetermined duty cycle and controlled linearly in a constant rotation state;
   wherein said keeping means comprises:
   first means for detecting said rotation speed of said motor to generate a rotation speed detection signal;
   second means for detecting said driving current of said driving means to generate a driving current detection signal;
   third means for detecting a position of a rotor of said motor to supply a rotor position detection signal to said supplying means;
   means for making a difference between said rotation speed setting signal and said rotation speed detection signal to generate a rotation speed difference signal;
   means for amplifying a difference between said rotation speed difference signal and said driving current detection signal to generate a linear mode control signal;
   first means for comparing said linear mode control signal with a standard voltage to generate a pulse width modulation signal;
   means for making a logic AND signal of said phase change signal and said pulse width modulation signal;
   means for amplifying said logic AND signal to supply a driving control signal to said driving means;
   a first switch selectively connecting one of inputs of said logic AND signal making means with a terminal selected from a power supply terminal and the pulse width modulation signal;
   a second switch selectively connecting a power supply terminal of said logic AND signal amplifying means with a terminal selected from said power supply terminal and the linear mode control signal; and
   second means for comparing said rotation speed difference signal with a threshold voltage to detect either said starting state or said constant rotation state;
   wherein said first switch connects said one of inputs of said logic AND signal making means with the pulse width modulation signal and said second switch connects said power supply terminal with said power supply terminal of said logic AND signal amplifying means at said starting state to supply said driving means with said driving control signal which is a pulse width modulation signal to make said driving current flow in an off-and-on way; and
   said first switch connects said one of inputs of said logic AND signal making means with said power supply terminal and said second switch connects said power supply terminal of said logic AND signal amplifying means with said linear mode control signal at said constant rotation state to supply said driving means with said driving control signal which is a linear signal to make said driving current change linearly.

2. A driving circuit for a motor comprising:
   a rotation speed control circuit for receiving a rotation speed setting signal and a rotation speed detection signal, for generating a control signal to change excitation phases, and for generating a rotation speed difference signal in accordance with a difference between said rotation speed setting signal and said rotation speed detection signal;
   an excitation phase changing circuit for generating a plurality of phase changing signals and a plurality of rotation speed control signals in accordance with said control signal from said rotation speed control circuit;
   first and second output stage drivers receiving said phase changing signals and rotation speed control signals and connected to said motor;
   a rotation speed detector for generating said rotation speed detection signal by detecting a rotation speed of said motor;
   a driving current detector, connected to said first and second output stage drivers, for generating a driving current detection signal by detecting a driving current of said motor;
   a first comparator for generating an output signal dependent on a difference between said rotation speed difference signal and said driving current detection signal;
   a second comparator for generating an output signal dependent on a difference between a triangle wave and said output signal of said first comparator;
   a circuit connected to said excitation phase changing circuit and said first and second output stage drivers and for supplying said rotation speed control signals to said first and second output stage drivers; and
   a rotation speed control signal supplying circuit providing a first state of supplying said plurality of rotation speed control signals to said first and second output stage drivers and a second state of not supplying said plurality of rotation speed control signals thereto dependent on said output signal of said second comparator at a starting time of said motor, and a state of amplifying said rotation speed control signals supplied to said first and second output stage drivers dependent on said output signal of said first comparator at a constant rotation time of said motor.

3. A driving circuit for a motor according to claim 2 wherein said rotation speed control signal supplying circuit comprises a plurality of switch means providing said first and second states.

4. A driving circuit for a motor according to claim 3 wherein said plurality of switch means are a plurality of logic AND circuits.

5. A driving circuit for a motor according to claim 2 wherein said rotation speed control signal supplying circuit comprises a plurality of amplifying means for amplifying said rotation speed control signal at said constant rotation time.

6. A driving circuit for a motor according to claim 5 wherein said plurality of amplifying means are a plurality of pre-drivers.

7. A driving circuit for a motor according to claim 2 wherein said rotation speed control signal supplying circuit comprises a plurality of logic AND circuits for providing said first and second states and a plurality of pre-drivers for providing said amplifying state.

8. A driving circuit for a motor comprising:
a rotation speed control circuit for receiving a rotation speed setting signal and a rotation speed detection signal, for generating a control signal to change excitation phases, and for generating a rotation speed difference signal in accordance with a difference between said rotation speed setting signal and said rotation speed detection signal;
an excitation phase changing circuit for generating a plurality of phase changing signals and a plurality of rotation speed control signals in accordance with said control signal from said rotation speed control circuit;
first and second output stage drivers, connected to said motor and receiving said plurality of phase changing signals and said rotation speed control signals, for driving the motor;
a rotation speed detector for generating said rotation speed detection signal by detecting a rotation speed of said motor;
a driving current detector for generating a driving current detection signal by detecting a driving current of said motor connected to said first and second output stage drivers;
a first comparator for generating an output signal dependent of a difference between said rotation speed difference signal and said driving current detection signal;
a second comparator for generating an output signal dependent on a difference between a triangle wave and said output signal of said first comparator;
a circuit connected to said excitation phase changing circuit and said first and second output stage drivers and for supplying said rotation speed control signals to said first and second output stage drivers; and
a rotation speed control signal supplying circuit providing a first state for supplying said plurality of rotation speed control signals to said first and second output stage circuits and a second state of not supplying said plurality of rotation speed control signals thereto dependent on said output signal of said second comparator being in a pulse width modulation driving mode, and a state of amplifying said rotation speed control signals supplied to said first and second output stage drivers dependent on said output signal of said first comparator during a linear driving mode.

9. A driving circuit for a motor according to claim 8 wherein said rotation speed control signal supplying circuit comprises a plurality of switch means providing said first and second states.

10. A driving circuit for a motor according to claim 9 wherein said plurality of switch means are a plurality of logic AND circuits.

11. A driving circuit for a motor according to claim 8 wherein said rotation speed control signal supplying circuit comprises a plurality of amplifying means providing said amplifying state.

12. A driving circuit for a motor according to claim 11 wherein said plurality of amplifying means are a plurality of pre-drivers.

13. A driving circuit for a motor, according to claim 8 wherein said rotation speed control signal supplying circuit comprises a plurality of logic AND circuits for providing said first and second states and a plurality of pre-drivers for providing said amplifying state.

14. A driving circuit for a motor according to claim 8 further comprising a detecting circuit for changing between said pulse width modulation driving mode and said linear driving mode by comparing a predetermined threshold value and said rotation speed difference signal.

15. A driving circuit for a motor according to claim 14 wherein said detecting circuit is a detector for detecting a starting state of said motor and a constant rotation state of said motor.

* * * * *